(12) United States Patent
Kim et al.

(10) Patent No.: US 10,197,395 B2
(45) Date of Patent: Feb. 5, 2019

(54) SYSTEM, APPARATUS, AND METHOD FOR ESTIMATING THREE-DIMENSIONAL (3D) POSITION AND DIRECTION PRECISELY

(71) Applicant: SAMSUNG ELECTRONICS CO., LTD, Suwon-si (KR)

(72) Inventors: Sang Hyun Kim, Yongin-si (KR); Hyong Euk Lee, Yongin-si (KR); Jung Bae Kim, Yongin-si (KR); Chang Kyu Choi, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1014 days.

(21) Appl. No.: 13/733,605

(22) Filed: Jan. 3, 2013

(65) Prior Publication Data

US 2013/0226514 A1 Aug. 29, 2013

(30) Foreign Application Priority Data

Feb. 29, 2012 (KR) .......................... 10-2012-0020945

(51) Int. Cl.
*G01C 3/08* (2006.01)
*G06F 17/00* (2006.01)
(Continued)

(52) U.S. Cl.
CPC .............. *G01C 3/08* (2013.01); *G01S 3/782* (2013.01); *G01S 5/16* (2013.01); *G01S 11/12* (2013.01); *G06F 17/00* (2013.01); *G01S 5/163* (2013.01)

(58) Field of Classification Search
CPC . G01S 5/16; G01S 3/783; G01S 11/06; G01S 5/14; G01S 17/89; G01S 5/0252;
(Continued)

(56) References Cited

U.S. PATENT DOCUMENTS 5,995,492 A * 11/1999 Klein ................... H04B 1/1615
370/280
7,486,274 B2 2/2009 Forlines et al.
(Continued)

FOREIGN PATENT DOCUMENTS

KR 10-2003-006792 A1 11/2003
KR 10-0813998 B1 3/2008
(Continued)

OTHER PUBLICATIONS

Hyong-Euk Lee, et al.; "High-precision 6-DOF motion tracking architecture with compact low-cost sensors for 3D manipulation", Consumer Electronics (ICCE), 2012 IEEE International Conference, Jan. 13-16, 2012, pp. 193-194.*

*Primary Examiner* — Roy Y Yi
*Assistant Examiner* — Jeffrey Aiello
(74) *Attorney, Agent, or Firm* — NSIP Law (57) ABSTRACT

A system, apparatus, and method for precisely estimating a three-dimensional (3D) position and a direction. The 3D position and direction estimation apparatus may estimate a distance between at least one receiver and at least one transmitter and a direction of a remote device, based on intensity information of a signal measured at the at least one receiver, may sequentially select the minimum number of intensity information for estimating the 3D position and the direction of the remote device, in a descending order of robustness against noise, based on the estimated distance and direction of the remote device, and may precisely estimate the 3D position and the direction of the remote device based on the selected intensity information.

21 Claims, 6 Drawing Sheets

(51) Int. Cl.
  *G01S 3/782* (2006.01)
  *G01S 5/16* (2006.01)
  *G01S 11/12* (2006.01)
(58) Field of Classification Search
  CPC .......... G01S 17/46; G01S 3/782; G01S 5/163;
       H04B 17/27; H04B 7/086; G06T 5/002;
       G01C 3/08; G06F 17/00
  USPC ............ 356/602; 455/456.1, 456.6; 382/103;
       702/104, 152
  See application file for complete search history.

(56) References Cited

U.S. PATENT DOCUMENTS

| | | | | |
|---|---|---|---|---|
| 8,134,888 | B2* | 3/2012 | Han | G01S 11/16 367/127 |
| 8,213,264 | B2* | 7/2012 | Lee | G01C 21/165 367/127 |
| 8,411,033 | B2* | 4/2013 | Choi | G06F 3/017 345/156 |
| 8,436,809 | B2* | 5/2013 | Sohn | A63F 13/04 345/156 |
| 8,700,356 | B2* | 4/2014 | Lee | G06F 1/1626 702/151 |
| 8,773,531 | B2* | 7/2014 | Kim | G06F 3/0346 348/131 |
| 8,804,119 | B2* | 8/2014 | Knox | G01N 21/53 356/337 |
| 8,965,729 | B2* | 2/2015 | Bang | G06F 3/0317 702/141 |
| 2002/0060788 | A1* | 5/2002 | Ohtomo | G01S 5/16 356/139.1 |
| 2004/0021566 | A1* | 2/2004 | Hayashi | F41G 3/2633 340/539.13 |
| 2007/0177161 | A1* | 8/2007 | Ishii | G01S 1/70 356/614 |
| 2007/0268481 | A1* | 11/2007 | Raskar | G01J 1/42 356/218 |
| 2010/0234071 | A1* | 9/2010 | Shabtay | H04B 7/0408 455/562.1 |
| 2010/0240396 | A1* | 9/2010 | Zhang | G01S 5/0284 455/456.1 |
| 2010/0247099 | A1* | 9/2010 | Lowery | H04B 10/2543 398/79 |
| 2011/0051835 | A1* | 3/2011 | Yuan | H04B 7/024 375/267 |
| 2011/0260968 | A1 | 10/2011 | Ye et al. | |
| 2012/0235864 | A1* | 9/2012 | Lu | G01S 5/0242 342/451 |
| 2013/0143595 | A1* | 6/2013 | Moshfeghi | G01S 5/0236 455/456.1 |
| 2013/0336628 | A1* | 12/2013 | Lamb | H04N 9/79 386/224 |
| 2014/0226158 | A1* | 8/2014 | Trainer | G02B 6/32 356/336 |
| 2016/0080050 | A1* | 3/2016 | Lastinger | H04B 7/0495 375/267 |

FOREIGN PATENT DOCUMENTS

| | | |
|---|---|---|
| KR | 10-2009-0028934 A1 | 3/2009 |
| KR | 10-2009-0097415 A1 | 9/2009 |
| KR | 10-2009-0126182 A1 | 12/2009 |
| KR | 10-2011-0021249 A1 | 3/2011 |
| KR | 10-2011-0082664 A1 | 7/2011 |

* cited by examiner

SYSTEM, APPARATUS, AND METHOD FOR ESTIMATING THREE-DIMENSIONAL (3D) POSITION AND DIRECTION PRECISELY

CROSS-REFERENCE TO RELATED APPLICATIONS

This application claims the priority benefit of Korean Patent Application No. 10-2012-0020945, filed on Feb. 29, 2012, in the Korean Intellectual Property Office, the disclosure of which is incorporated herein by reference.

BACKGROUND

1. Field

Example embodiments of the following disclosure relate to a system, apparatus, and method for precisely estimating a three-dimensional (3D) position and a direction, and more particularly, to a system, apparatus, and method for selecting intensity information based on a sensitivity to noise and estimating a 3D position and a direction based on the selected intensity information, thereby enhancing the accuracy.

2. Description of the Related Art

In general, technology for estimating a three-dimensional (3D) position and a direction of a moving object or target may be used to sense a motion of an object, a human body, an animal, and the like, within a 3D space using expensive and large motion capturing equipment in the field of graphics or animation, and the like.

Consumer electronics (CE) motion sensing technology associated with the game industry has been gaining attention, and thus, many 3D position and direction methods using inexpensive and small motion capturing devices have been developed.

For example, a method of estimating a 3D position in a space may generally include a method of using a camera, a method of using an infrared ray, and a method of using an inertial sensor.

In the case of using a camera, it is possible to convert a position of a marker or light source, which is focused within a camera image, to a spatial 3D position, using a plurality of two-dimensional (2D) cameras. However, the accuracy of the conversion depends on a camera resolution, a marker size, and the like, and thus, it is difficult to perform highly accurate sensing.

In the case of using an ultrasonic wave, when the time of flight (TOF) of an ultrasonic wave from a transmitter to a receiver is measured, under the assumption that an ultrasonic wave moves at the velocity of sound, for example, about 340 m/s in the air, a distance may be calculated. When information about at least three same view distances is obtained, the 3D position may be calculated. In the case of using an ultrasonic wave, it is possible to perform highly precise sensing with inexpensive equipment, as compared to expensive equipment, such as, a camera. However, due to interference between sound waves, signals may not be simultaneously transmitted. Considering an ultrasonic signal attenuation time, for example, about 100 m/sec for 3 m, it may be difficult to estimate a position of a moving object in real time.

In the case of using an inertial sensor, it is possible to estimate a 3D position by integrating acceleration, motion and gravitational acceleration values, which are obtained using a gyro sensor, and a motion acceleration component that is calculated using angular velocity. However, errors may be accumulated over time. That is, the above method may perform a position estimation only within a short time interval, and thus, may not be suitable for the position estimation within a long time interval.

To solve the above issue, a method of estimating a 3D position and a direction using a signal attenuation characteristic of infrared ray is proposed. However, due to a nonlinearity of the signal attenuation characteristic, an area sensitive to noise may occur, which may affect the accuracy in estimating the 3D position and the direction.

SUMMARY

The foregoing and/or other aspects are achieved by providing an apparatus for precisely estimating a three-dimensional (3D) position and a direction, comprising an estimator to estimate a 3D position and a direction of a remote device using a signal attenuation characteristic when intensity information is received, the signal attenuation characteristic varying based on a distance and a direction, a distance calculator to calculate a distance between at least one transmitter and at least one receiver based on the 3D position of the remote device, and a priority determining unit to verify a noise sensitivity of intensity information based on the distance between the at least one transmitter and the at least one receiver and a noise sensitivity of intensity information based on the direction of the remote device, and to determine a priority of intensity information to be used for position estimation based on the noise sensitivity.

The estimator may select the minimum number of intensity information for estimating the 3D position and the direction of the remote device based on the priority, and may precisely estimate the 3D position and the direction of the remote device based on the selected intensity information.

The priority determining unit may determine, as the noise sensitivity, a change difference of intensity information occurring due to a change in the distance or the direction that occurs due to a nonlinear characteristic of the signal attenuation characteristic.

The priority determining unit may assign a relatively low priority to intensity information that is relatively sensitive to noise. The estimator may sequentially select the minimum number of intensity information for estimating the 3D position and the direction of the remote device, in a descending order of the priority, and may precisely estimate the 3D position and the direction of the remote device based on the selected intensity information.

The remote device may include one of the at least one transmitter or the at least one receiver.

The intensity information may include intensity of an optical signal emitted at a predetermined wavelength or intensity of an electromagnetic field.

The foregoing and/or other aspects are achieved by providing a method of precisely estimating a 3D position and a direction, including estimating a 3D position and a direction of a remote device using a signal attenuation characteristic when intensity information is received, the signal attenuation characteristic varying based on a distance and a direction, calculating a distance between at least one transmitter and at least one receiver based on the 3D position of the remote device, verifying a noise sensitivity of intensity information based on the distance between the at least one transmitter and the at least one receiver and a noise sensitivity of intensity information based on the direction of the remote device, determining a priority of intensity information to be used for position estimation based on the noise sensitivity, selecting the minimum number of intensity information for estimating the 3D position and the direction of the remote device based on the priority, and precisely estimating the 3D position and the direction of the remote device based on the selected intensity information.

The determining may include determining, as the noise sensitivity, a change difference of intensity information occurring due to a change in the distance or the direction that occurs due to a nonlinear characteristic of the signal attenuation characteristic.

The determining may include assigning a relatively low priority to intensity information that is relatively sensitive to noise.

The selecting may include sequentially selecting the minimum number of intensity information for estimating the 3D position and the direction of the remote device, in a descending order of the priority.

The intensity information may include intensity of an optical signal emitted at a predetermined wavelength or intensity of an electromagnetic field.

The foregoing and/or other aspects are achieved by providing a system for precisely estimating a 3D position and a direction, including a transmission apparatus comprising at least one transmitter to transmit a signal for signal measurement, a reception apparatus comprising at least one receiver to receive the signal and measure intensity of the signal, and to output intensity information, a remote device comprising the at least one transmitter or the at least one receiver, and an estimation apparatus to select the minimum number of intensity information for estimating the 3D position and the direction of the remote device, from among the intensity information in a descending order of robustness against noise, and to precisely estimate the 3D position and the direction of the remote device based on the selected intensity information.

The estimation apparatus may include an estimator to estimate the 3D position and the direction of the remote device using a signal attenuation characteristic when intensity information is received from the at least one receiver, the signal attenuation characteristic varying based on a distance and a direction, a distance calculator to calculate a distance between the at least one transmitter and the at least one receiver based on the 3D position of the remote device, and a priority determining unit to verify a noise sensitivity of intensity information based on the distance between the at least one transmitter and the at least one receiver and a noise sensitivity of intensity information based on the direction of the remote device, and to determine a priority of intensity information to be used for position estimation based on the noise sensitivity.

The estimator may select the minimum number of intensity information for estimating the 3D position and the direction of the remote device based on the priority, and may precisely estimate the 3D position and the direction of the remote device based on the selected intensity information.

The priority determining unit may determine, as the noise sensitivity, a change difference of intensity information occurring due to a change in the distance or the direction that occurs due to a nonlinear characteristic of the signal attenuation characteristic.

The priority determining unit may assign a relatively low priority to intensity information that is relatively sensitive to noise. The estimator may sequentially select the minimum number of intensity information for estimating the 3D position and the direction of the remote device, in a descending order of the priority, and may precisely estimate the 3D position and the direction of the remote device based on the selected intensity information.

The intensity information may include intensity of an optical signal emitted at a predetermined wavelength or intensity of an electromagnetic field.

When the number of transmitters is one, at least three receivers may be configured, when the number of transmitters is two, at least two receivers may be configured, and when the number of transmitters is at least three, at least one receiver may be configured.

When at least two transmitters are included in the transmission apparatus, directional directions of two transmitters may be different from each other and an angle between the directional directions may be predetermined.

Synchronization of the transmission apparatus and the reception apparatus is performed using a synchronization signal.

A nonlinear characteristic of the intensity information is used to assign the priority to the intensity information.

Additional aspects of embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Reference will now be made in detail to embodiments, examples of which are illustrated in the accompanying drawings, wherein like reference numerals refer to the like elements throughout. Embodiments are described below to explain the present disclosure by referring to the figures.

A signal may have an attenuation characteristic, and thus, a measured intensity of a signal may vary based on a distance between a transmitter and a receiver, and a directional direction of each of the transmitter and the receiver. Even though there are some signals that have such attenuation characteristic, description will be made based on an infrared signal in the following disclosure.

Figure 1:
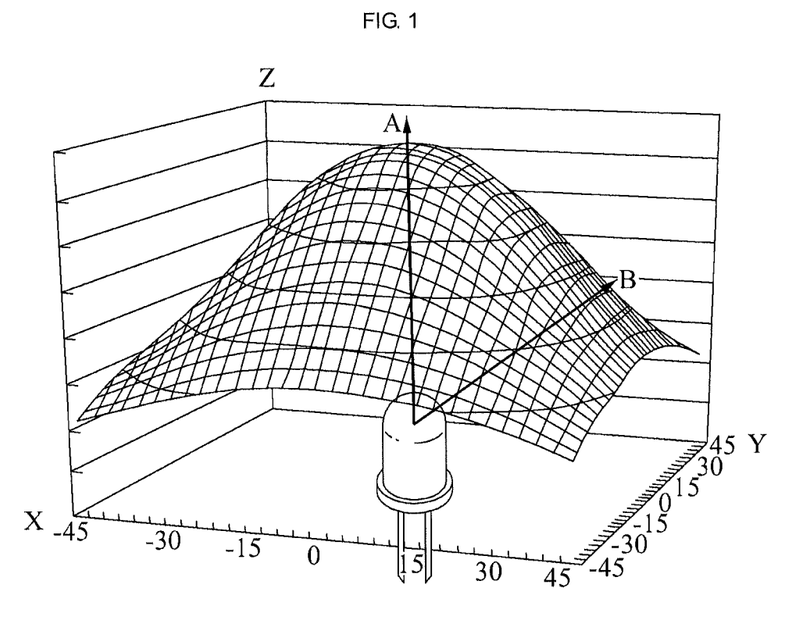
FIG. 1 illustrates a transmission directional characteristic of an infrared ray of which received intensity varies based on a transmission directional direction of an infrared signal, according to an example embodiment.

FIG. 1 illustrates a transmission directional characteristic of an infrared ray of which received intensity varies based on a transmission directional direction of an infrared signal, according to an example embodiment.

Referring to FIG. 1, an infrared ray has a characteristic that a received intensity of the infrared ray varies based on a direction angle of a transmitter, that is, a directional direction of an infrared signal in a predetermined distance. In FIG. 1, Z axis denotes intensity of a transmission infrared ray, and each of X axis and Y axis denotes a measurement angle measured by the transmitter. In the following description, the transmission directional characteristic indicates a characteristic of an infrared ray that a received intensity varies based on a direction into which an infrared signal is transmitted by the transmitter.

Figure 2:
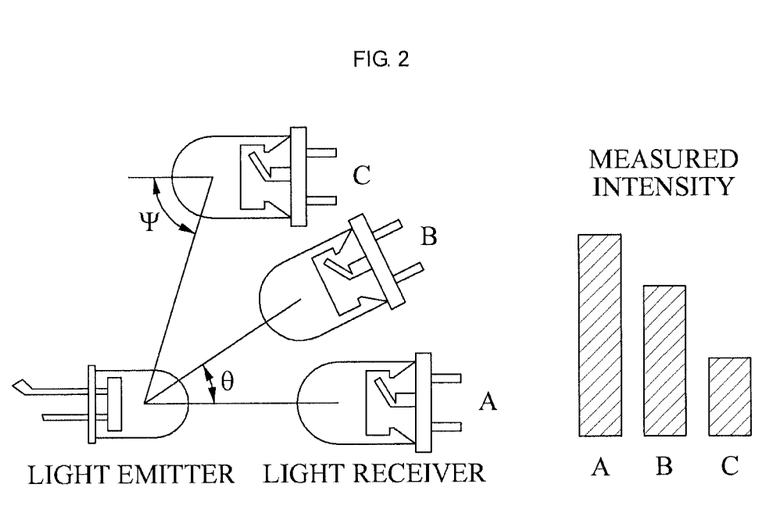
FIG. 2 illustrates a transmission directional characteristic and a reception directional characteristic of an infrared signal, according to an example embodiment.

FIG. 2 illustrates a transmission directional characteristic and a reception directional characteristic of an infrared signal, according to an example embodiment.

Referring to FIG. 2, when comparing a received intensity of A and a received intensity of B, it can be known that a received intensity of the infrared signal varies based on a transmission directional direction angle θ. The received intensity of the infrared signal may also be affected by a reception directional direction angle ψ that is a direction from which a receiver receives the infrared signal. In the following description, the reception directional characteristic indicates a characteristic of an infrared ray that a received intensity varies based on a direction from which the infrared ray is received by the receiver.

Signal intensity measured based on a distance between a transmitter and the receiver may have a characteristic as expressed by Equation 1:

$$I \propto \frac{1}{r^2} \quad \text{[Equation 1]}$$

In Equation 1, I denotes the measured signal intensity, and r denotes the distance between the transmitter and the receiver.

Based on a directional direction of the transmitter, the measured signal intensity may have a characteristic as expressed by Equation 2.

$$I \propto \cos(\kappa\theta) \quad \text{[Equation 2]}$$

In Equation 2, I denotes the measured signal intensity, κ denotes a variable indicating an attenuation characteristic of the transmitter, and θ denotes a direction angle directed by the transmitter.

The signal intensity measured based on a directional direction of the receiver may have a characteristic as expressed by Equation 3.

$$I \propto \cos(\lambda\psi) \quad \text{[Equation 3]}$$

In Equation 3, I denotes the measured signal intensity, λ denotes a variable indicating an attenuation characteristic of the receiver, and ψ denotes a direction angle directed by the receiver.

Using all of the characteristics based on the distance between the transmitter and the receiver, the directional direction or directed angle of the transmitter, and the directional direction or directed angle of the receiver, signal intensity of the infrared ray may be measured according to Equation 4.

$$I = \alpha\cos(\kappa\theta) \cdot \frac{1}{r^2} \cdot \cos(\lambda\psi) \quad \text{[Equation 4]}$$

In Equation 4, I denotes the measured signal intensity, r denotes the distance between the distance between the transmitter and the receiver, α denotes a scale factor using characteristics of the transmitter and the receiver, κ denotes the variable indicating the attenuation characteristic of the transmitter, θ denotes the direction angle directed by the transmitter, λ denotes the variable indicating the attenuation characteristic of the receiver, and ψ denotes the direction angle directed by the receiver.

Figure 3:
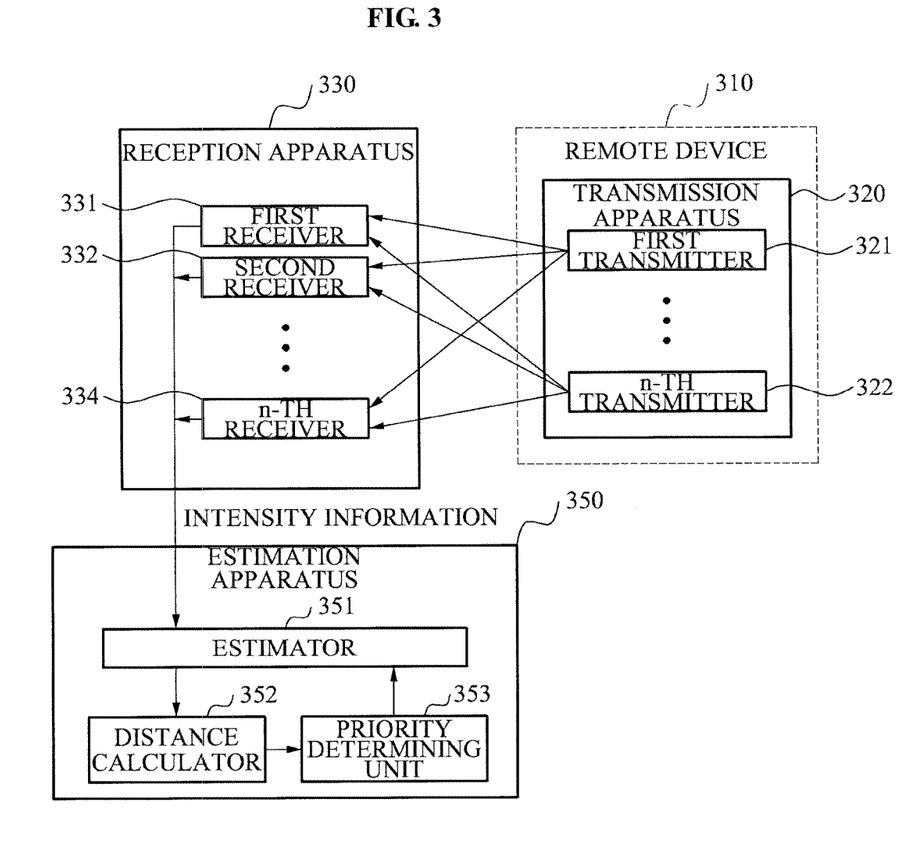
FIG. 3 illustrates a configuration of a system for precisely estimating a three-dimensional (3D) position and a direction, according to an example embodiment.

FIG. 3 illustrates a configuration of a system for precisely estimating a 3D position and a direction, according to an example embodiment.

Referring to FIG. 3, the 3D position/direction estimation system may include a remote device 310, a transmission apparatus 320, a reception apparatus 330, and an estimation apparatus 350.

The remote device 310 may include the transmission apparatus 320 as a target device to estimate a position and a direction. Even though the remote device 310 includes the transmission apparatus 320 in FIG. 3, the remote device 310 may include the reception apparatus 330 instead of including the transmission apparatus 320. That is, the remote device 310 may include either the transmission apparatus 320 or the reception apparatus 330.

The transmission apparatus 320 may include at least one transmitter, for example, a first transmitter 321, . . . , an n-th transmitter 322.

Each transmitter may transmit a signal. Here, when the transmission apparatus 320 includes at least two transmitters, directional directions of the at least two transmitters may be different from each other and an angle between the directional directions may be predetermined. A signal transmitted from each transmitter may be an optical signal and may also be an electromagnetic field. As a representative example of the optical signal, an infrared ray may be used. When each transmitter transmits an optical signal, each transmitter may be a light emitter. When each transmitter transmits an electromagnetic field, each transmitter may be an electromagnetic field transmitter. Although the present disclosure is not limited thereto, the following description will be made using the example in which each transmitter transmits an optical signal.

One of at least one transmitter may function as an infrared transmitter of a remote controller to control an electronic device.

The reception apparatus 330 may include at least one receiver, for example, a first receiver 331, a second receiver 332, . . . , an n-th receiver 334.

Each receiver may receive a signal transmitted from each transmitter and measure intensity of the received signal. Here, when the reception apparatus 330 includes at least two receivers, a position and a directional direction of each of the at least two receivers may be predetermined. That is, positions and the direction of the at least two receivers may be set to be different from each other.

As discussed above, a signal received by each receiver may be an optical signal and may also be an electromagnetic field. When each receiver receives an optical signal, each receiver may be a light receiver. When each receiver receives an electromagnetic field, each receiver may be a magnetometer. Although the present disclosure is not limited thereto, the following description will be made using the example in which each receiver receives an optical signal.

When the transmission apparatus 320 includes at least two transmitters, each receiver may identify each of the at least two transmitters based on a predetermined order of the received signals. Synchronization of the transmission apparatus 320 with the reception apparatus 330 may be performed, when the transmission apparatus 320 includes at least two transmitters, and when each receiver receives a synchronization signal prior to receiving a signal from the transmission apparatus 320.

When the transmission apparatus 320 includes at least two transmitters, each receiver may separate signals of different frequencies using a filter (not shown) and thereby identify a transmitter corresponding to a predetermined frequency.

The estimation apparatus 350 may select, from intensity information received from the receivers, for example, the first receiver 331, the second receiver 332, . . . , the n-th receiver 334, the minimum number of intensity information in a descending order of robustness against noise and thereby precisely estimate a 3D position and a direction of the remote device 310.

The estimation apparatus 350 may include an estimator 351, a distance calculator 352, and a priority determining unit 353.

When intensity information is received from the receivers, the estimator 351 may estimate a 3D position and a direction of the remote device 310 using a signal attenuation characteristic of the received signal. Here, the signal attenuation characteristic may vary based on a distance between the transmission apparatus 320 and the reception apparatus 330 and a direction of the received signal.

The distance calculator 352 may calculate a distance between at least one transmitter and at least one receiver based on a known position of a transmitter and the 3D position of the remote device 310.

The priority determining unit 353 may verify a noise sensitivity of intensity information based on the distance between the at least one transmitter and the at least one receiver and a noise sensitivity of intensity information based on the direction of the remote device 310, and may determine a priority of intensity information to be used for position estimation based on the noise sensitivity.

The priority determining unit 353 may determine, as the noise sensitivity, a change difference of intensity information occurring due to a change in the distance or the direction that occurs due to a nonlinear characteristic of the signal attenuation characteristic. Here, the priority determining unit 353 may assign a relatively low priority to intensity information that is relatively sensitive to noise. Accordingly, the priority determining unit 353 may determine a priority of the intensity information to be used for position estimation, based on noise sensitivity of the intensity information.

A system of estimating a position and a direction using signal intensity information may estimate the position and the direction using a signal attenuation characteristic based on a distance of a signal and a signal attenuation characteristic based on the direction. Hereinafter, the signal attenuation characteristic based on the distance and the signal attenuation characteristic based on the direction will be described with reference to FIG. 4 and FIG. 5.

Figure 4:
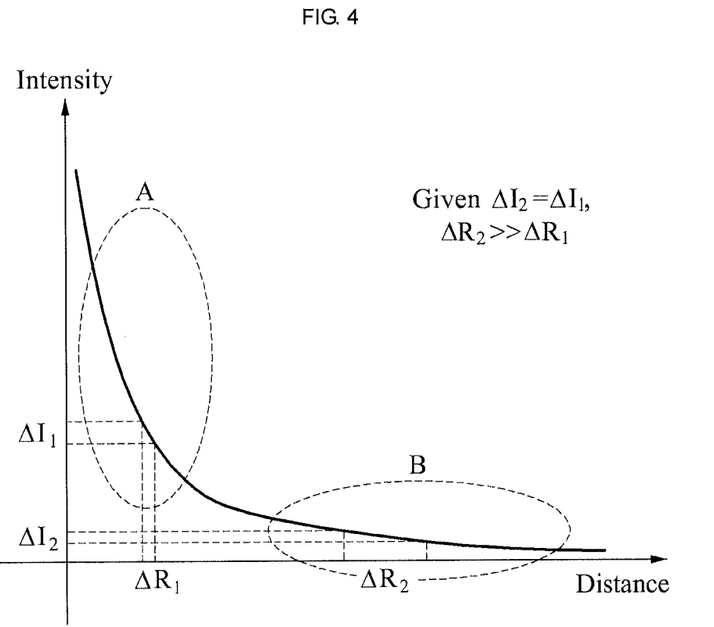
FIG. 4 illustrates a signal attenuation characteristic based on a distance between a transmitter and a receiver, according to an example embodiment.

FIG. 4 illustrates a signal attenuation characteristic based on a distance between a transmitter and a receiver, according to an example embodiment.

Figure 5:
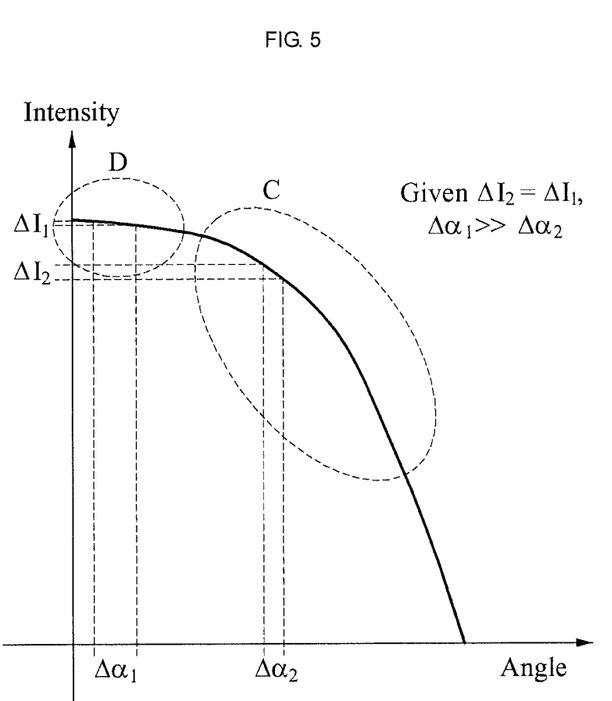
FIG. 5 illustrates a signal attenuation characteristic based on a direction directed by a transmitter and a receiver, according to an example embodiment.

FIG. 5 illustrates a signal attenuation characteristic based on a direction directed by a transmitter and a receiver, according to an example embodiment.

Intensity information according to the signal attenuation characteristic may have a model of being in inverse proportion to a square of the distance as shown in FIG. 4, and a model of including a Lambertian characteristic with a cosine value of a directional angle as shown in FIG. 5. Using the above models, it is possible to determine the distance between the receiver and the transmitter, and the directed angle from the measured intensity information.

However, two models of FIG. 4 and FIG. 5 have a nonlinear characteristic. Due to the nonlinear characteristic, there is a significant change in intensity information compared to a change in the distance or the angle, as shown in FIG. 4 and FIG. 5. That is, as shown in an area A of FIG. 4 and an area C of FIG. 5, in some sections, a change in the distance or the angle is small compared to a change in the intensity information. In addition, as shown in an area B of FIG. 4 and an area D of FIG. 5, in some sections, a change in the distance or the angle is significant compared to a change in the intensity information. In particular, when the change in the intensity information is assumed as noise, a section for estimating the distance and the angle may increase in the areas B and D, which may result in increasing an error in the position and direction estimation. That is, the areas B and D may be sensitive to noise, and the areas A and C may be relatively robust against noise.

Accordingly, the priority determining unit 353 may assign a relatively low priority to the areas B and D, and may assign a relatively high priority to the areas A and C. Again, the priority determining unit 353 may determine a priority of the intensity information to be used for position estimation, based on noise sensitivity of the intensity information.

The estimator 351 may sequentially select the minimum number of intensity information for estimating the 3D position and the direction of the remote device 310, in a descending order of the priority, and may precisely estimate the 3D position and the direction of the remote device 310 based on the selected intensity information.

Hereinafter, a method of precisely estimating a 3D position and a direction in the 3D position/direction estimation system configured as above according to an embodiment will be described with reference to FIG. 6.

Figure 6:
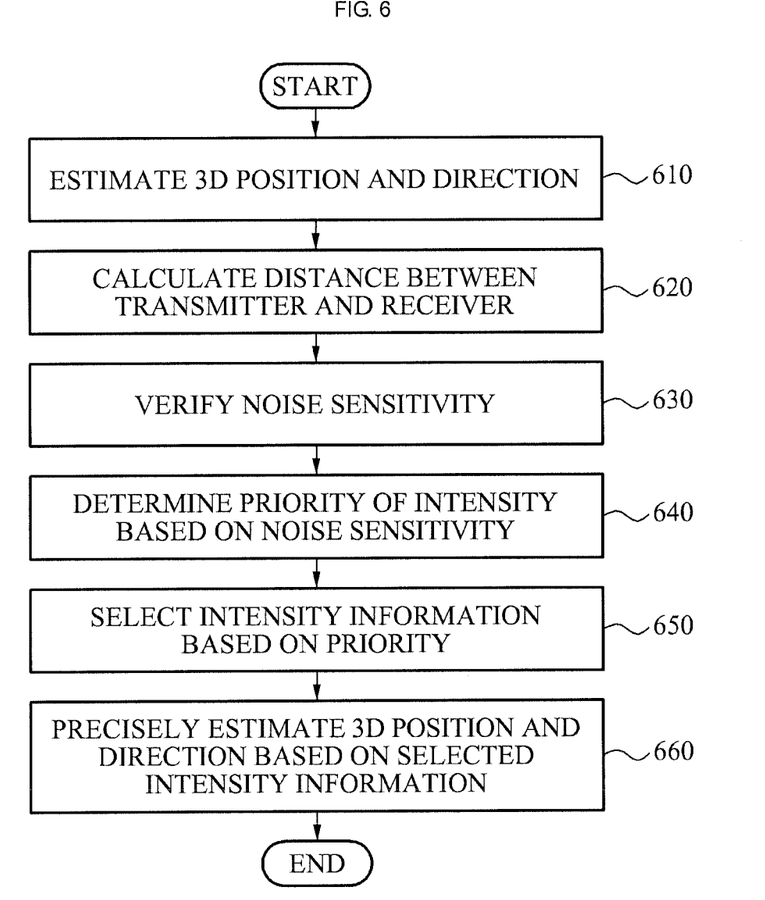
FIG. 6 illustrates a method of precisely estimating a 3D position and a direction in an estimation apparatus of a 3D position/direction estimation system.

FIG. 6 illustrates a method of precisely estimating a 3D position and a direction in the estimation apparatus 350 of the 3D position/direction estimation system according to an embodiment.

In operation 610, the estimation apparatus 350 may estimate a 3D position and a direction of a remote device using a signal attenuation characteristic when intensity information is received. Here, the signal attenuation characteristic may vary based on a distance and a direction.

In operation 620, the estimation apparatus 350 may calculate a distance between at least one transmitter and at least one receiver based on the 3D position of the remote device.

In operation 630, the estimation apparatus 350 may verify a noise sensitivity of intensity information based on the distance between the at least one transmitter and the at least one receiver and a noise sensitivity of intensity information based on the direction of the remote device. Here, the noise sensitivity may be determined based on a change difference of intensity information occurring due to a change in the distance or the direction that occurs due to a nonlinear characteristic of the signal attenuation characteristic.

In operation 640, the estimation apparatus 350 may determine a priority of intensity information to be used for position estimation based on the noise sensitivity. Here, the estimation apparatus 350 may assign a relatively low priority to intensity information that is relatively sensitive to noise.

In operation 650, the estimation apparatus 350 may select the minimum number of intensity information for estimating the 3D position and the direction of the remote device based on the priority.

In operation 660, the estimation apparatus 350 may precisely estimate the 3D position and the direction of the remote device based on the selected intensity information.

According to embodiments, there may be provided an estimation apparatus that may precisely estimate a 3D position and a direction of a remote device by sequentially selecting the minimum number of intensity information for estimating the 3D position and the direction of the remote device, in a descending of robustness against noise. The estimation apparatus may be configured using an infrared ray based transmitter and receiver and thus, may be configured to have a small size at inexpensive costs and may also increase the accuracy of position and direction estimation.

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on non-transitory computer-readable media comprising computer-readable recording media. Examples of the computer-readable recording media include a magnetic recording apparatus, an optical disk, a magneto-optical disk, and/or a semiconductor memory (for example, RAM, ROM, etc.). Examples of the magnetic recording xapparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW.

Further, according to an aspect of the embodiments, any combinations of the described features, functions and/or operations can be provided.

Moreover, at least the system or apparatus for estimating a 3D position may include at least one processor to execute at least one of the above-described units and methods.

Although embodiments have been shown and described, it would be appreciated by those skilled in the art that changes may be made in these embodiments without departing from the principles and spirit of the disclosure, the scope of which is defined by the claims and their equivalents.

What is claimed is:

1. An apparatus for precisely estimating a three-dimensional (3D) position and a direction, comprising:
   a receiving circuit comprising receivers, each of the receivers configured to receive signals from infrared transmitters of a remote device and comprising a filter configured to separate signals of different frequencies and identify one of the infrared transmitters having a predetermined frequency;
   one or more hardware processors to
   estimate 3D positions of the infrared transmitters and directions of each of the infrared transmitters toward each of the receivers, based on intensity information of the received signals relative to an angle of transmission of the received signals and an angle of reception of the received signals, and a signal attenuation characteristic, assign a priority to each of the received signals based on the estimated 3D positions, the estimated directions, and the signal attenuation characteristic,
   select some of the received signals based on a highest priority, and
   estimate a 3D position and a direction of the remote device toward the apparatus, based on intensity information of the selected some of the received signals and the signal attenuation characteristic; and
   a graphics processor configured to create moving images of the infrared transmitters of the remote device based on their respective estimated 3D positions of the remote device using some of the received signals based on the priority,
   wherein the one or more hardware processors assign a high priority to a received signal whose intensity is greatly attenuated according to a change in a distance or a direction with respect to the remote device compared to other received signals, and wherein the remote device is controlled based on the received signal having the high priority.

2. The apparatus of claim 1, wherein the one or more hardware processors selects a minimum number of the received signals for estimating the 3D position and the direction of the remote device based on the priority, and precisely estimates the 3D position and the direction of the remote device based on the selected received signals, and
   wherein the signal attenuation characteristic varies based on a distance between a transmitter of the remote device and a receiver of the receiving circuit and a direction of the transmitter towards the receiver.

3. The apparatus of claim 1, wherein the one or more hardware processors determines a noise sensitivity of each of the received signals based on a change in an intensity according to a change in a distance or a direction that is determined based on the signal attenuation characteristic, and assigns the priority to each of the received signals based on the noise sensitivity.

4. The apparatus of claim 1, wherein:
   one or more hardware processors assigns a relatively low priority to the received signals that is determined relatively sensitive to noise, and
   sequentially selects the minimum number of the received signals for estimating the 3D position and the direction of the remote device, in a descending order of the priority, and precisely estimates the 3D position and the direction of the remote device based on the selected received signals.

5. The apparatus of claim 1, wherein the intensity information comprises intensity of an optical signal emitted at a predetermined wavelength.

6. The apparatus of claim 1, wherein the assigning of the priority is based on consideration of different noise sensitivities for different nonlinear characteristics of each of the intensity information used for the estimating of the position of the remote device.

7. The apparatus of claim 1, wherein the one or more hardware processors assigns a lowest priority to the received signal corresponding to an area in which a change in the calculated respective distances and angles required to effect a predetermined change in intensity is largest, and assigns a highest priority to the received signal corresponding to an area in which a change in the calculated respective distances and angles required to effect the predetermined change in intensity is smallest.

8. A method of precisely estimating a three-dimensional (3D) position and a direction, comprising:
   receiving, using receivers, signals from infrared transmitters of a remote device;
   filtering the signals to separate signals of different frequencies and identify one of the infrared transmitters having a predetermined frequency;
   estimating, using one or more hardware processors, 3D positions of the infrared transmitters and directions of each of the infrared transmitters toward each of the receivers, based on intensity information of the received signals relative to an angle of transmission of the received signals and an angle of reception of the received signals, and a signal attenuation characteristic;

assigning, using one or more hardware processors, a priority to each of the received signals based on the estimated 3D positions, the estimated directions, and the signal attenuation characteristic;

selecting, using one or more hardware processors, some of the received signals based on a highest priority;

estimating, using one or more hardware processors, a 3D position and a direction of the remote device toward the apparatus, based on intensity information of the selected some of the received signals and the signal attenuation characteristic;

creating moving images, using a graphics processor, of the infrared transmitters of the remote device based on their respective estimated 3D positions of the remote device using some of the received signals based on the priority, wherein the assigning comprising assigning a high priority to a received signal whose intensity is greatly attenuated according to a change in a distance or a direction with respect to the remote device compared to other received signals; and controlling the remote device based on the received signal having the high priority.

9. The method of claim 8, further comprising determining a noise sensitivity of each of the received signals based on a change in an intensity according to a change in a distance or a direction that determined based on the signal attenuation characteristic, and wherein the priority is assigned based on the noise sensitivity, and wherein the signal attenuation characteristic varies based on the calculated respective distances and the direction.

10. The method of claim 8, wherein the assigning comprises assigning a relatively low priority to the received signals that is determined relatively sensitive to noise.

11. The method of claim 8, wherein the selecting comprises sequentially selecting the minimum number of the received signals for estimating the 3D position and the direction of the remote device, in a descending order of the determined priority.

12. The method of claim 8, wherein the intensity information comprises an intensity of an optical signal emitted at a predetermined wavelength or an intensity of an electromagnetic field.

13. A system for precisely estimating a three-dimensional (3D) position and a direction, comprising:

a remote device comprising infrared transmitters to transmit signals;

a reception apparatus comprising receivers to receive the transmitted signals from the infrared transmitters and to measure respective intensities of the received signals, and to output intensity information based on the measured respective intensities, the receivers comprising a filter configured to separate signals of different frequencies and identify one of the infrared transmitters having a predetermined frequency;

an estimation apparatus to:

estimate 3D positions of the infrared transmitters and directions of each of the infrared transmitters toward each of the receivers, based on intensity information of the received signals relative to an angle of transmission of the received signals and an angle of reception of the received signals, and a signal attenuation characteristic, assign a priority to each of the received signals based on the estimated 3D positions, the estimated directions, and the signal attenuation characteristic, select some of the received signals based on a highest priority, and estimate a 3D position and a direction of the remote device toward the apparatus, based on intensity information of the selected some of the received signals and the signal attenuation characteristic; and a graphics processor configured to create moving images of the infrared transmitters of the remote device based on their respective estimated 3D positions of the remote device using some of the received signals based on the priority, wherein the estimation apparatus assigns a high priority to a received signal whose intensity is greatly attenuated according to a change in a distance or a direction with respect to the remote device compared to compared to other received signals, and wherein the remote device is controlled based on the received signal having the high priority.

14. The system of claim 13, wherein the estimation apparatus selects a minimum number of the received signals for estimating the 3D position and the direction of the remote device based on the priority, and precisely estimates the 3D position and the direction of the remote device based on the selected the received signals.

15. The system of claim 14, wherein the estimation apparatus determines the robustness against noise of each of the received signals based on a change in an intensity according to a change in a distance or a direction determined based on the signal attenuation characteristic, and assign the priority to each of the received signals based on the noise sensitivity, wherein the signal attenuation characteristic varies based on the distance and the direction.

16. The system of claim 14, wherein:

the estimation apparatus assigns a relatively low priority to the received signals that is determined relatively sensitive to noise, and sequentially selects the minimum number of the received signals for estimating the 3D position and the direction of the remote device, in a descending order of the priority, and precisely estimates the 3D position and the direction of the remote device based on the received signals.

17. The system of claim 13, wherein the intensity information comprises an intensity of an optical signal emitted at a predetermined wavelength or an intensity of an electromagnetic field.

18. The system of claim 13, wherein:

when a total number of infrared transmitters of the remote device is two, at least two receivers are configured, and when a total number of infrared transmitters of the remote device is at least three, at least one receiver is configured.

19. The system of claim 13, wherein directional directions of each of the infrared transmitters are different from each other and an angle between the directional directions is predetermined.

20. The system of claim 13, wherein synchronization of the transmission apparatus and the reception apparatus is performed using a synchronization signal.

21. The system of claim 16, wherein nonlinear characteristics of the intensity information, having different robustness against noise dependent on their nonlinear characteristics, are considered to assign respective priorities to the intensity information.

\* \* \* \* \*